United States Patent
Feldt et al.

(10) Patent No.: US 8,677,857 B2
(45) Date of Patent: Mar. 25, 2014

(54) HANDLE BRAKE DEVICE

(75) Inventors: Mats Feldt, Älmhult (SE); Henrik Marken, Vislanda (SE); Jos Van Houtem, Grimslöv (SE); Edward Dahlin, Diö (SE)

(73) Assignee: Invacare International SARL, Gland (CH)

( * ) Notice: Subject to any disclaimer, the term of this patent is extended or adjusted under 35 U.S.C. 154(b) by 0 days.

(21) Appl. No.: 13/500,520

(22) PCT Filed: Oct. 1, 2010

(86) PCT No.: PCT/IB2010/054450
§ 371 (c)(1),
(2), (4) Date: Apr. 5, 2012

(87) PCT Pub. No.: WO2011/042849
PCT Pub. Date: Apr. 14, 2011

(65) Prior Publication Data
US 2012/0198957 A1 Aug. 9, 2012

(30) Foreign Application Priority Data

Oct. 5, 2009 (EP) ..................................... 09172223

(51) Int. Cl.
*F16C 1/10* (2006.01)

(52) U.S. Cl.
USPC ....................................................... 74/502.2

(58) Field of Classification Search
USPC .................. 74/500.5, 501.6, 502.2, 523, 526
See application file for complete search history.

(56) References Cited

U.S. PATENT DOCUMENTS

| 4,899,610 | A | | 2/1990 | Bourret | |
|---|---|---|---|---|---|
| 5,279,179 | A | | 1/1994 | Yoshigai | |
| 5,878,625 | A | * | 3/1999 | Hu | ............................... 74/502.2 |
| 6,202,502 | B1 | * | 3/2001 | Chung-Che | ................... 74/502.2 |
| 6,457,377 | B1 | * | 10/2002 | Hsu | ............................... 74/502.2 |
| 2002/0088298 | A1 | * | 7/2002 | Hsu | ............................... 74/502.2 |

FOREIGN PATENT DOCUMENTS

| DE | 29905014 | 6/1999 |
|---|---|---|
| DE | 19851419 | 5/2000 |
| EP | 0882646 | 12/1998 |
| EP | 09172223.1 | 10/2009 |
| WO | 2011042849 | 4/2011 |

OTHER PUBLICATIONS

English Abstract for DE 29905014.
English Abstract for DE 19851419.

* cited by examiner

*Primary Examiner* — Vicky Johnson
(74) *Attorney, Agent, or Firm* — Calfee, Halter & Griswold, LLP

(57) ABSTRACT

A handle brake device comprising: —a housing fixable onto the handlebar of the wheelchair or the wheeled walker, —a brake lever rotatably installed on said housing, —a transmission cable connected to said brake lever through a cable connector, said cable connector defining a connecting point, characterized in that the brake lever comprises a first arc hole and a second arc hole, inside each of which a pivot pin fixedly connected to said housing is slideably engaged in such a manner as to provide dual pivot for the brake lever, respectively a first pivot and a second pivot.

16 Claims, 4 Drawing Sheets

HANDLE BRAKE DEVICE

This application is the U.S. national phase entry of PCT/IB2010/054450, with an international filing date of 1 Oct. 2010, which claims the benefit of European patent application serial no. 09172223.1, with a filing date of 5 Oct. 2009, the entire disclosures of which are fully incorporated herein by reference.

FIELD OF THE INVENTION

The present invention relates to a handle brake device suitable for being installed on a handlebar of a wheelchair or a wheeled walker to control a transmission cable connected at one end to the handle brake device and at the other end to a brake structure mounted on a wheel of the wheelchair or the wheeled walker. In addition, it can be applied and mounted on bicycles, motorbikes, scooters or any type of transportation device that makes use of a manually driven brake.

BACKGROUND OF THE INVENTION

Wheelchairs or wheeled walkers have been widely used for aged or disabled people as a convenient vehicle. In many wheelchairs or wheeled walkers a brake is provided for emergency situations. Conventionally, the operator grasps a brake lever to pivot with respect to handlebar for effecting a brake. The pivot movement of the brake lever induces a stretching movement of the transmission cable connected at one end to the brake lever. Finally, the stretching movement of the transmission cable modifies the position of a brake mechanism mounted on a wheel of the wheelchair or the wheeled walker so as to reduce the speed or stop the wheelchair or the wheeled walker.

In the conventional handle brake devices, the brake lever is pivotally attached to a housing about a single pivot and the transmission cable is attached through a connector to the brake lever. Accordingly, the connecting position between the transmission cable and the brake lever remains fixed relative to the single pivot. Therefore, in these conventional devices, the movement of the transmission cable is not differentiated according to various operational positions of the brake lever. Considering that the resistance of the transmission cable is often higher at the end of the braking, when the brake lever is close to the handlebar, than at the beginning of the braking, when the brake lever is distant from the handlebar, it is often difficult, especially for persons with small hands, to transmit a sufficient force on the brake lever permitting to stop completely the wheelchair. In this case, the force torque executed by the hand of the operator on the brake lever is independent of the angular position of the brake lever.

One solution to this problem consists to modify the position of the connecting point of the transmission cable with regard to the pivot of the brake lever during the braking. Indeed, by modifying the position of the connecting point, it is possible to adapt the distance between the connecting point and the pivot in relation to the position of the brake lever. Therefore, by keeping constant the traction force of the operator on the brake lever and by reducing the distance between the connecting point and the pivot, the stretching force exerted on the transmission cable should be higher. Such a solution can be found for instance in the U.S. Pat. No. 5,279,179. The brake device for bicycle, revealed by this prior art, uses a force transmission ratio adjusting means for moving the connecting point of the transmission cable toward, and away from, the brake lever pivot. However, this solution is relatively complex and imposes the use of a specific cable connector.

The aim of the present invention is therefore to provide a handle brake device permitting to adapt the distance between the connecting point and the pivot in relation to the position of the brake lever, said device being simple to manufacture and easy to be manipulated. A further aim of the present invention is to provide a handle brake device in which the force torque executed by the hand of the operator on the brake lever is depending on the angular position of the brake lever.

SUMMARY OF THE INVENTION

In this view the present invention is concerned with a handle brake device suitable for being installed on a handlebar of a wheelchair, a wheeled walker, a bicycle, a motorbike, a scooter or any type of transportation device that makes use of a manually driven brake to control a transmission cable connected at one end to the hand brake device and at the other end to a brake mechanism mounted on a wheel of the wheelchair or the wheeled walker comprising:
  a housing fixable onto the handlebar of the wheelchair or the wheeled walker,
  a brake lever rotatably installed on said housing,
  a transmission cable connected to said brake lever through a cable connector, said cable connector defining a connecting point,
wherein the brake lever comprises a first arc hole and a second arc hole, inside each of which a pivot pin fixedly connected to said housing is slideably engaged in such a manner as to provide dual pivot for the brake lever, respectively a first pivot and a second pivot, each arc hole having a lower end and a higher end and being configured so that said brake lever rotates firstly around said first pivot when said first pivot is positioned at the lower end of the first arc hole and said second pivot is positioned at the higher end of the second arc hole and secondly around said second pivot when said first pivot is positioned at the lower end of the first arc hole and said second pivot is positioned at the lower end of the second arc hole, the distance separating the lower end of the second arc hole and the connecting point being less than the distance separating the lower end of the first arc hole and the connecting point.

According ton one embodiment of the handle brake device of the invention, the first arc hole describes approximately an arc around the second pivot when said second pivot is positioned at the lower end of the second arc hole and the second arc hole describes approximately an arc around the first pivot when said first pivot is positioned at the lower end of the first arc hole.

According to one embodiment of the invention, the brake lever comprises a third hole, inside which a pin fixedly connected to said housing is slideably engaged, in such a manner as to provide a guiding means for said brake lever during its rotation around said first pivot and said second pivot, said third hole being configured so as to prevent that said brake lever rotates firstly around said second pivot when said first pivot is positioned at the lower end of the first arc hole and said second pivot is positioned at the higher end of the second arc hole, wherein the third hole may describe approximately an arc around the first pivot when said first pivot is positioned at the lower end of the first arc hole and an arc around the second pivot when said second pivot is positioned at the lower end of the second arc hole, and wherein the third hole may have an approximately heart formed shape.

BRIEF DESCRIPTION OF THE DRAWINGS

Other features and advantages of the present invention will appear more clearly from the detailed description of embodiments of the invention which are presented solely by way of a non-restricted example and illustrated by the attached drawings in which.

DETAILED DESCRIPTION OF EMBODIMENTS OF THE INVENTION

Figure 1:
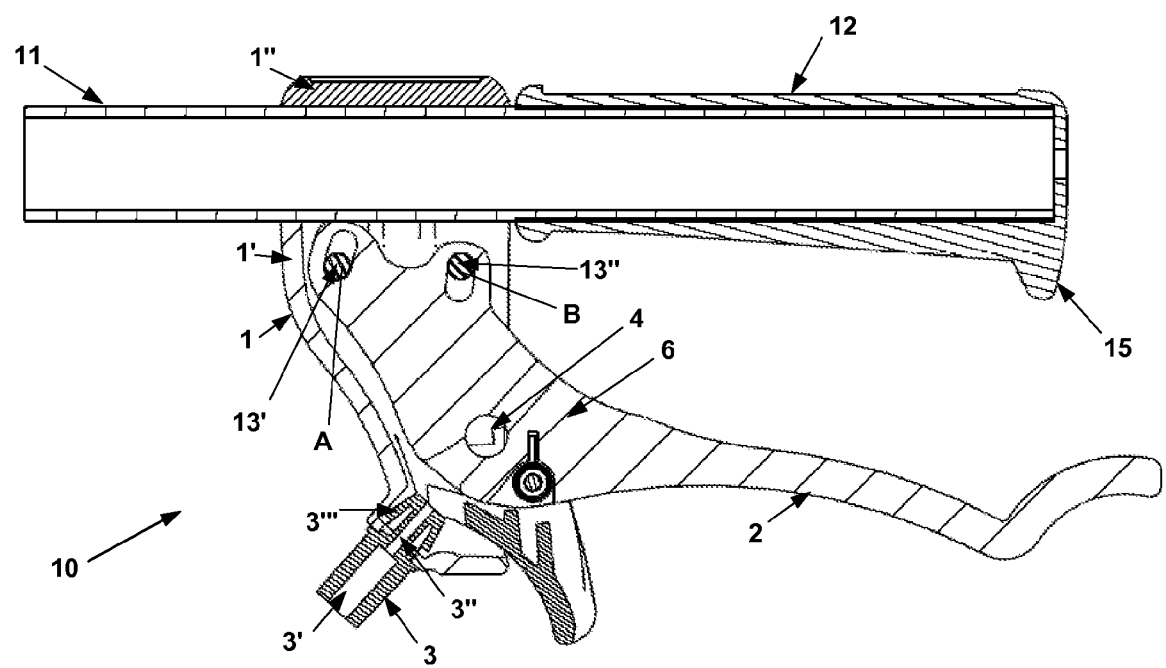
FIG. 1 is a front sectional view of a handle brake device of the present invention connected to a handlebar of a wheelchair, in a non-brake position.

In reference to FIG. 1, a handle brake device for a wheelchair according the present invention is shown.

The handle brake device 10 of the present invention mainly includes a housing 1 fixedly connected to a handlebar 11 of the wheelchair, in close proximity to a handlebar grip 12 fixed at the end of the handlebar 11, said housing 2 comprising a bottom housing 1' positioned under said handlebar 11 and a top housing 1" positioned over said handlebar 11, a brake lever 2 pivotally connected to said bottom housing 1' and a transmission cable (not shown) which includes a sleeve portion and a steel cable. One end of the sleeve portion is inserted inside a first hole 3' of a cable guide 3 mounted onto the bottom housing 1' and the steel cable goes accross a second hole 3" of said cable guide, said second hole 3" extending between said first hole 3' and a distal end of said cable guide 3 positioned inside said housing 1. The steel cable is connected at one end to a cable connector 4 disposed inside said brake lever 2. Accordingly, an aperture 5 (see FIG. 2) is formed in the lower part of the bottom housing 1' to permit the introduction of a connecting means 3''' provided at the distal end of said cable guide 3. Said connecting means 3''' can consist in two flexible wings extending obliquely along said cable guide 3 which be folded so as to permit the introduction of said distal end through said aperture 5. A through hole 6 is also formed in the brake lever 2 to permit the crossing of the steel cable through the brake lever 2.

Figure 2:
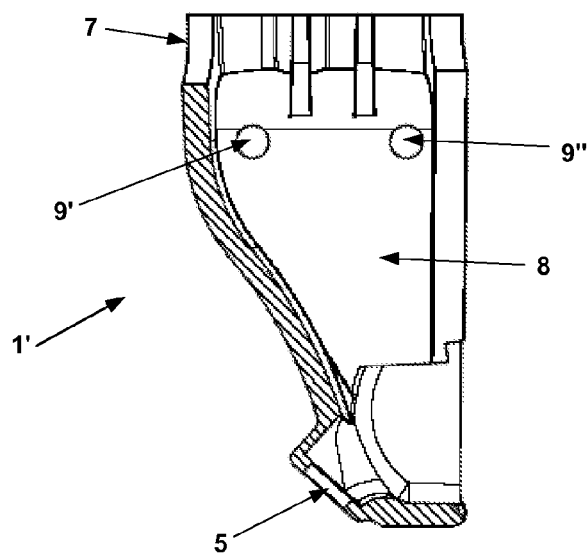
FIG. 2 is a front sectional view of the bottom housing of the handle brake device of FIG. 1.

In reference to FIG. 2, the bottom housing 1' of the handle brake device 10 of FIG. 1 is shown. Said bottom housing 1' has a through passage 7 formed at its upper end for the handlebar 11 of the wheelchair to partially extend therethrough. Said bottom housing 1' also defines a working space 8 in a lower portion thereof below said through passage 7. A pair of holes 9' and 9" are formed on two side walls of said bottom housing 1', said holes 9' and 9" being positioned in the upper part of the working space 8 and being approximately equidistant from the through passage 7. A pair of pivot pins 13' and 13" (as shown in FIG. 1) may be extended through said holes 9' and 9" to pivotally connect the brake lever 2 to the bottom housing 1', such that said brake lever 2 may be turned about said pivot pins 13' and 13" to move upward and downward relative to the handlebar 11.

Figure 3:
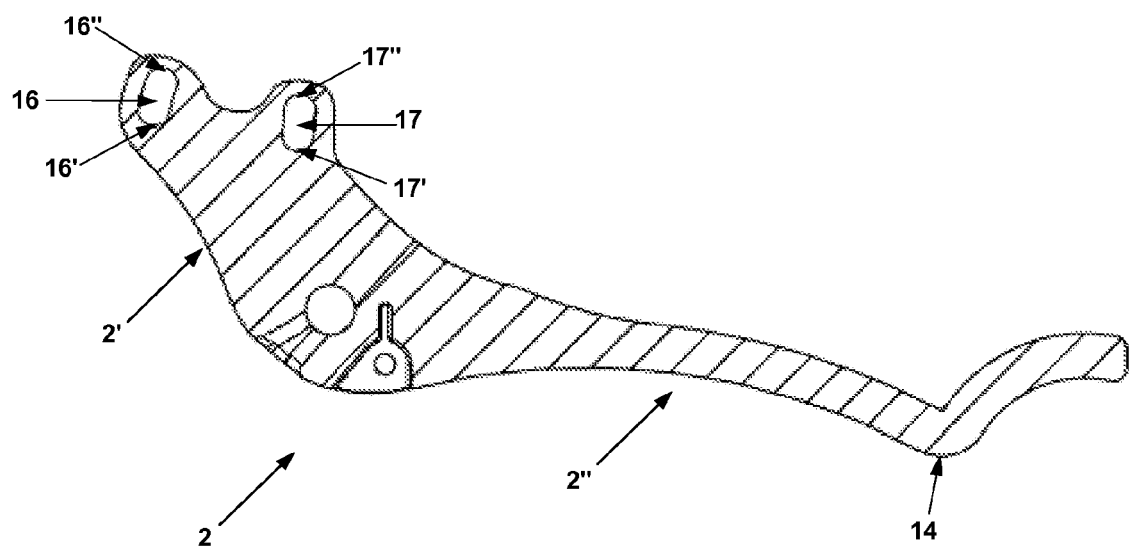
FIG. 3 is a front sectional view of the brake lever of the handle brake device of FIG. 1.

In reference to FIG. 3, the brake lever 2 of the handle brake device 10 of FIG. 1 is shown. This brake lever 2 has a connecting portion 2' on one end and a handle portion 2" on the other end. The handle portion 2" is contoured to fit one hand with a knob 14 near its extreme end to prevent slipping when in use. The handle portion 2" is also contoured to fit to a complementary form 15 of the handlebar grip 12 (as shown in FIG. 1) when the brake lever 2 is in its final braking position. This brake lever 2 also contains in an upper part of the connecting portion 2' a first arc hole 16 and a second arc hole 17, said holes 16 and 17 being configured to receive respectively the first pivot pin 13' and the second pivot pin 13" in such a manner as to provide dual pivot for the lever, respectively a first pivot A and a second pivot B (as shown in FIG. 1). This arrangement completely captivates the lever 2, while allowing a dual movement within. Each arc hole 16, respectively 17, is defined by a lower end 16', respectively 17', and a higher end 16", respectively 17", the higher end 16", respectively 17", being closer to the handlebar 11 than the lower end 16', respectively 17'. The first arc hole 16 describes approximately an arc around the second pivot B when said second pivot B is positioned at the lower end 17' of the second arc hole 17 and the second arc hole 17 describes approximately an arc around the first pivot A when said first pivot A is positioned at the lower end 16' of the first arc hole 16.

Figure 4:
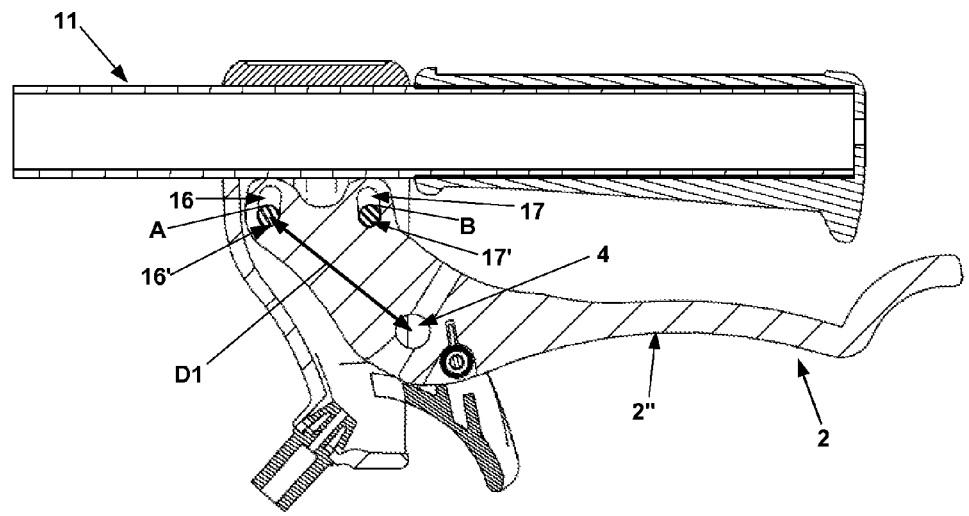
FIG. 4 is a front sectional view similar to FIG. 1 but in a first braking position.

In reference to FIG. 4, it is shown the position of the brake lever 2 when the handle portion 2" is manually rotated toward the handlebar 11 of the wheelchair. The brake lever 2 has pivoted on the first pivot A positioned at the lower end 16' of the first arc hole 16. Therefore, the second pivot B moved from its initial position at the higher end 17" of the second arc hole 17 to its final position at the lower end 17' of the second arc hole 17. In this first braking step, the connecting point 4 rotates on the first pivot A. The distance between said connecting point 4 and said first pivot A is D1.

Figure 5:
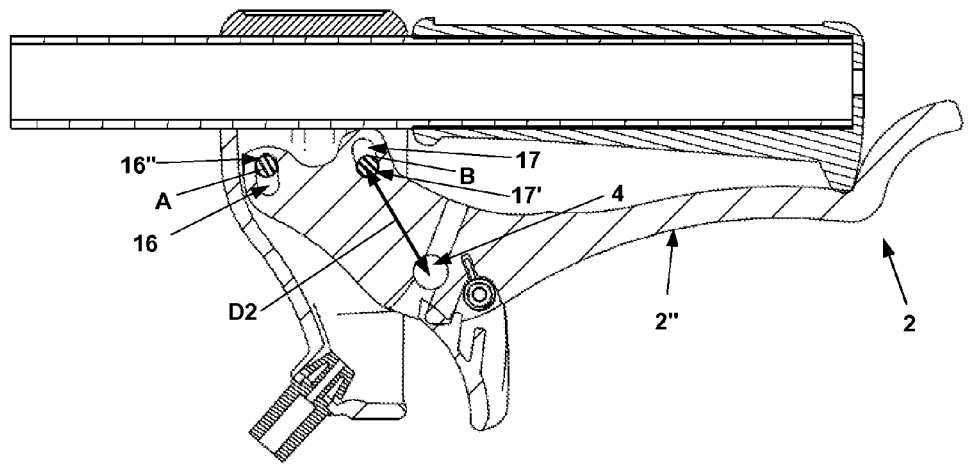
FIG. 5 is a front sectional view similar to FIG. 1 but in a second braking position.

In reference to FIG. 5, it is shown the position of the brake lever 2 when the handle portion 2" is further rotated toward the handlebar 11 of the wheelchair. The brake lever 2 has pivoted on the second pivot B positioned in the lower end 17' of the second arc hole 17. Therefore, the first pivot A moved from its initial position at the lower end 16' of the first arc hole 16 to its final position at the higher end 16" of the first arc hole 16. In this second braking step, the connecting point 4 rotates on the second pivot B. The distance between said connecting point 4 and said second pivot B is D2. Considering that D2 is less than D1, the operator provided less effort during the second braking step than in the first braking step.

Figure 6:
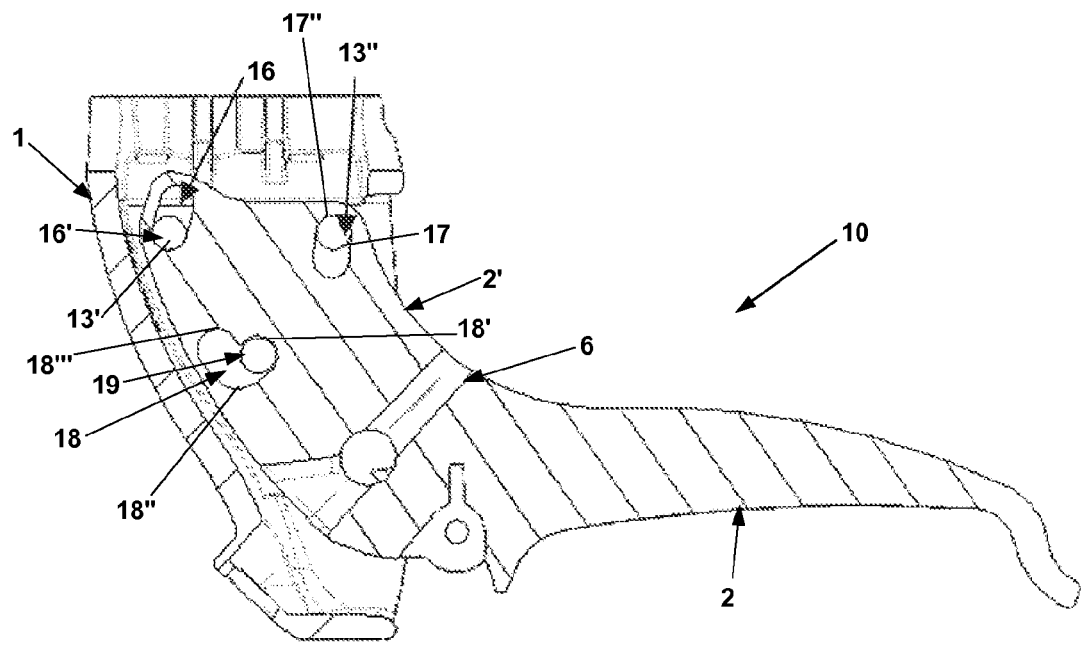
FIG. 6 is a front sectional view of a further embodiment of the handle brake device of the present invention in its non-brake position.
Figure 7:
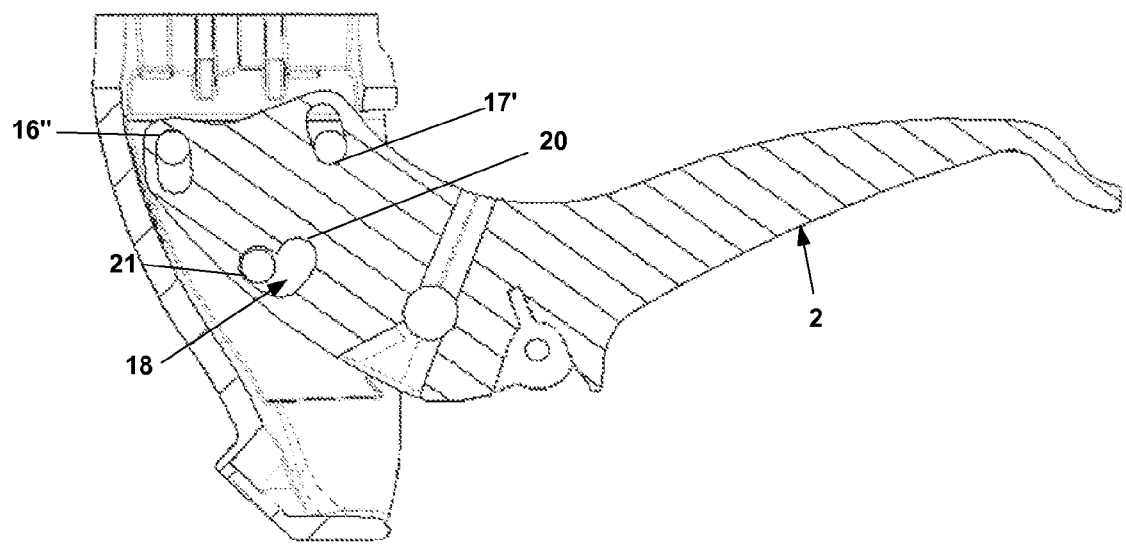
FIG. 7 is a front sectional view similar to FIG. 6 but in the second braking position of the handle brake device.

In reference to FIGS. 6 and 7, it is shown a further embodiment of the handle brake device of the present invention.

In this embodiment, the brake lever 2 comprises an additional third hole 18 formed in the middle part of the connected portion 2' of said brake lever 2, said hole 18 being configured to receive a third pin 19, fixedly connected to the housing 1 of the handle brake device 10. Said third hole 18 has a specific contour, said contour being configured to abut against said third pin 19 during the first and the second rotation of the brake lever 2 respectively around the first pin 13' and the second pin 13" so as to provide a guiding means for the brake lever 2 during the first and the second braking step. In particular, said contour defines respectively three end positions 18', 18" and 18''', corresponding to the position of the third pin 19 respectively in the non-brake position of the brake lever 2 (as illustrated in FIG. 6), in the position of the brake lever 2 at the end of the first braking step (non illustrated) and in the position of the brake lever 2 at the end of the second braking step (as illustrated in FIG. 7). Said contour comprises also a first part 20 and a second part 21 (as illustrated in FIG. 7), said first part 20 joining the end positions 18' and 18" and said second part 21 joining the end positions 18" and 18'''. Said first and second parts 20 and 21 are configured to lower the efforts applied by the brake lever 2 on the first and second pins 13' and 13" during the first and second braking steps by comparison to the embodiment illustrated in FIG. 1. These lower efforts limit the risk of a brake of said pins 13' and 13" during the use of the handle brake device 10. Accordingly, in an advantageous embodiment of the present invention, said first part 20 describes approximately an arc around the first pin 13' when said first pin 13' is positioned at the lower end 16' of the first arc hole 16 and said second part 21 describes an arc around the second pin 13" when said second pin 13" is positioned at the lower end 17' of the second arc hole 17. Furthermore, said part 20 is also configured to prevent that, in the non-brake position illustrated in FIG. 6, the brake lever 2 rotates firstly around said second pin 13", and not around said first pin 13'. Indeed, such a possibility can exceptionally occur in the embodiment illustrated in FIG. 1. However, such a possibility is not desirable in the present invention because, in this case, the user has to apply a continuous braking force and not a progressive braking force.

In a further advantageous embodiment of the present invention, said third hole 18 has an approximately heart formed shape.

The invention claimed is:

1. Handle brake device suitable for being installed on a handlebar of a wheelchair, a wheeled walker, a bicycle, a motorbike, a scooter or any type of transportation device that makes use of a manually driven brake to control a transmission cable connected at one end to the hand brake device and at the other end to a brake mechanism mounted on a wheel of the wheelchair or the wheeled walker comprising:
   a housing fixable onto the handlebar of the wheelchair or the wheeled walker,
   a brake lever rotatably installed on said housing,
   a transmission cable connected to said brake lever through a cable connector, said cable connector defining a connecting point,
wherein the brake lever comprises a first arc hole and a second arc hole, inside each of which a pivot pin fixedly connected to said housing is slideably engaged in such a manner as to provide dual pivot for the brake lever, respectively a first pivot and a second pivot, each arc hole having a lower end and a higher end and being configured so that said brake lever rotates firstly around said first pivot when said first pivot is positioned at the lower end of the first arc hole and said second pivot is positioned at the higher end of the second arc hole, and secondly around said second pivot when said first pivot is positioned at the lower end of the first arc hole and said second pivot is positioned at the lower end of the second arc hole, the distance separating the lower end of the second arc hole and the connecting point being less than the distance separating the lower end of the first arc hole and the connecting point.

2. Handle brake device according to claim 1, wherein the first arc hole describes approximately an arc around the second pivot when said second pivot is positioned at the lower end of the second arc hole and the second arc hole describes approximately an arc around the first pivot when said first pivot is positioned at the lower end of the first arc hole.

3. Handle brake device according to claim 2, wherein the brake lever comprises a third hole, inside which a pin fixedly connected to said housing is slideably engaged, in such a manner as to provide a guide for said brake lever during its rotation around said first pivot and said second pivot, said third hole being configured so as to prevent that said brake lever rotates firstly around said second pivot when said first pivot is positioned at the lower end of the first arc hole and said second pivot is positioned at the higher end of the second arc hole.

4. Handle brake device according to claim 3, wherein the third hole describes approximately an arc around the first pivot when said first pivot is positioned at the lower end of the first arc hole and an arc around the second pivot when said second pivot is positioned at the lower end of the second arc hole.

5. Handle brake device according to claim 4, wherein the third hole has an approximately heart formed shape.

6. Handle brake device according to claim 1, wherein the brake lever comprises a third hole, inside which a pin fixedly connected to said housing is slideably engaged, in such a manner as to provide a guide for said brake lever during its rotation around said first pivot and said second pivot, said third hole being configured so as to prevent that said brake lever rotates firstly around said second pivot when said first pivot is positioned at the lower end of the first arc hole and said second pivot is positioned at the higher end of the second arc hole.

7. Handle brake device according to claim 6, wherein the third hole describes approximately an arc around the first pivot when said first pivot is positioned at the lower end of the first arc hole and an arc around the second pivot when said second pivot is positioned at the lower end of the second arc hole.

8. Handle brake device according to claim 7, wherein the third hole has an approximately heart formed shape.

9. Handle brake device suitable for being installed on a handlebar of a wheelchair, a wheeled walker, a bicycle, a motorbike, a scooter or any type of transportation device that makes use of a manually driven brake to control a transmission cable connected at one end to the hand brake device and at the other end to a brake mechanism mounted on a wheel of the wheelchair or the wheeled walker comprising:
   a housing fixable onto the handlebar of the wheelchair or the wheeled walker,
   a brake lever rotatably installed on said housing,
   a transmission cable connected to said brake lever through a cable connector, said cable connector defining a connecting point,
wherein the brake lever comprises a first closed arc hole and a second closed arc hole, inside each of which a pivot pin fixedly connected to said housing is slideably engaged in such a manner as to provide dual pivot for the brake lever, respectively a first pivot and a second pivot, and in such a manner as to completely captivate the brake lever, each closed arc hole having a lower end and a higher end and being configured so that said brake lever rotates firstly around said first pivot when said first pivot is positioned at the lower end of the first closed arc hole and said second pivot is positioned at the higher end of the second closed arc hole, and secondly around said second pivot when said first pivot is positioned at the lower end of the first closed arc hole and said second pivot is positioned at the lower end of the second closed arc hole, the distance separating the lower end of the second closed arc hole and the connecting point being less than the distance separating the lower end of the first closed arc hole and the connecting point.

10. Handle brake device according to claim 9, wherein the first closed arc hole describes approximately an arc around the second pivot when said second pivot is positioned at the lower end of the second closed arc hole and the second closed arc hole describes approximately an arc around the first pivot when said first pivot is positioned at the lower end of the first closed arc hole.

11. Handle brake device according to claim 10, wherein the brake lever comprises a third hole, inside which a pin fixedly connected to said housing is slideably engaged, in such a manner as to provide a guide for said brake lever during its rotation around said first pivot and said second pivot, said third hole being configured so as to prevent that said brake lever rotates firstly around said second pivot when said first pivot is positioned at the lower end of the first closed arc hole and said second pivot is positioned at the higher end of the second closed arc hole.

12. Handle brake device according to claim 11, wherein the third hole describes approximately an arc around the first pivot when said first pivot is positioned at the lower end of the first closed arc hole and an arc around the second pivot when said second pivot is positioned at the lower end of the second closed arc hole.

13. Handle brake device according to claim 12, wherein the third hole has an approximately heart formed shape.

14. Handle brake device according to claim 9, wherein the brake lever comprises a third hole, inside which a pin fixedly connected to said housing is slideably engaged, in such a manner as to provide a guide for said brake lever during its rotation around said first pivot and said second pivot, said third hole being configured so as to prevent that said brake lever rotates firstly around said second pivot when said first pivot is positioned at the lower end of the first closed arc hole and said second pivot is positioned at the higher end of the second closed arc hole.

15. Handle brake device according to claim 14, wherein the third hole describes approximately an arc around the first pivot when said first pivot is positioned at the lower end of the first closed arc hole and an arc around the second pivot when said second pivot is positioned at the lower end of the second closed arc hole.

16. Handle brake device according to claim 15, wherein the third hole has an approximately heart formed shape.

\* \* \* \* \*

UNITED STATES PATENT AND TRADEMARK OFFICE
CERTIFICATE OF CORRECTION

PATENT NO.         : 8,677,857 B2
APPLICATION NO.    : 13/500520
DATED              : March 25, 2014
INVENTOR(S)        : Mats Feldt et al.

Page 1 of 1

It is certified that error appears in the above-identified patent and that said Letters Patent is hereby corrected as shown below:

In the Claims,

Column 5, claim 3, line 58, "claim 2" should read --claim 1--.

Column 6, claim 6, line 9, "claim 1" should read --claim 2--.

Column 6, claim 11, line 65, "claim 10" should read --claim 9--.

Column 7, claim 14, line 16, "claim 9" should read --claim 10--.

Signed and Sealed this
Thirtieth Day of December, 2014

Michelle K. Lee
*Deputy Director of the United States Patent and Trademark Office*